July 4, 1967
G. J. MELCHER
3,328,818
REINFORCED WALK RAMP
Filed March 31, 1965
4 Sheets-Sheet 1
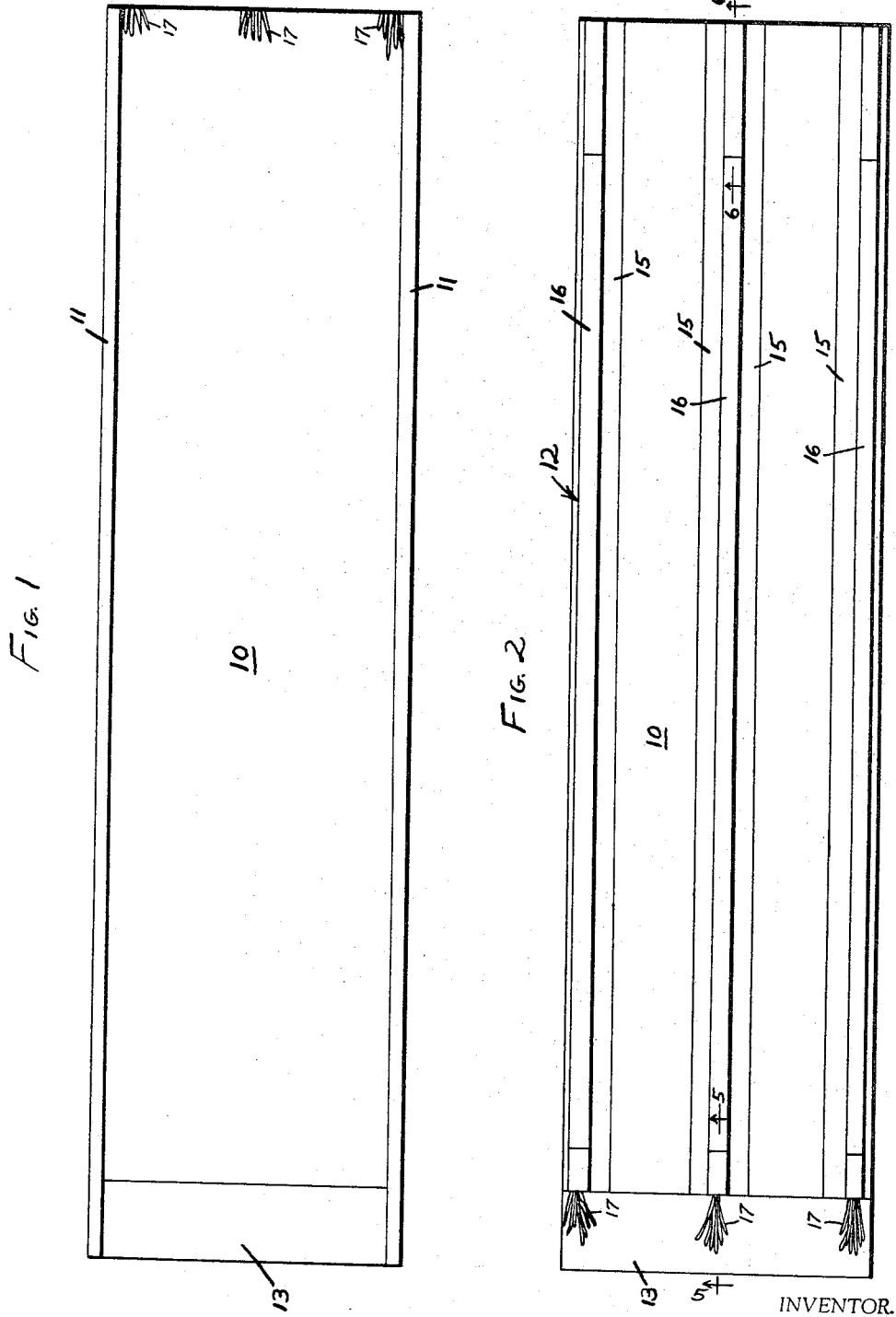
INVENTOR.
GLEE J. MELCHER
BY
ATTYS.

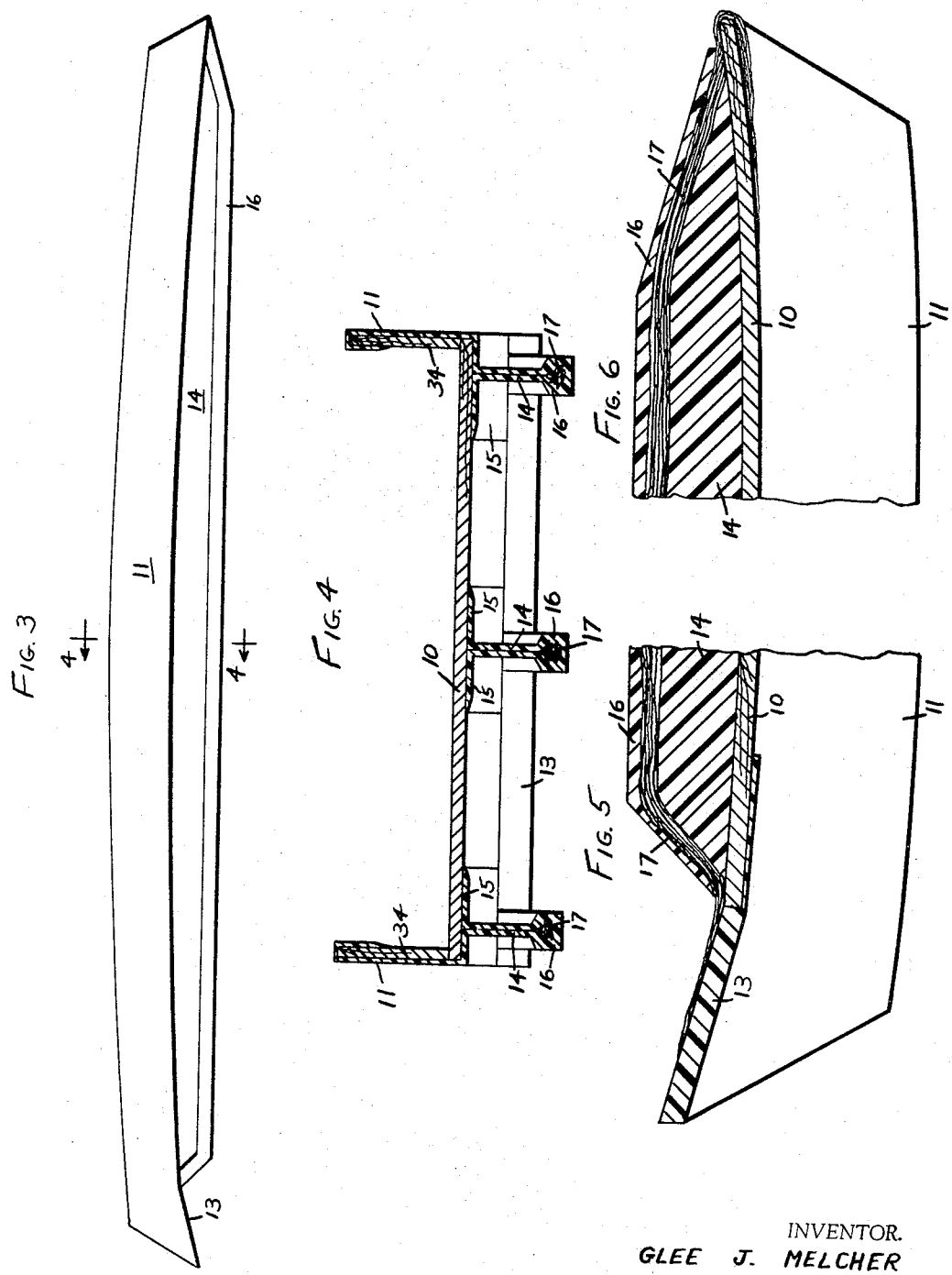

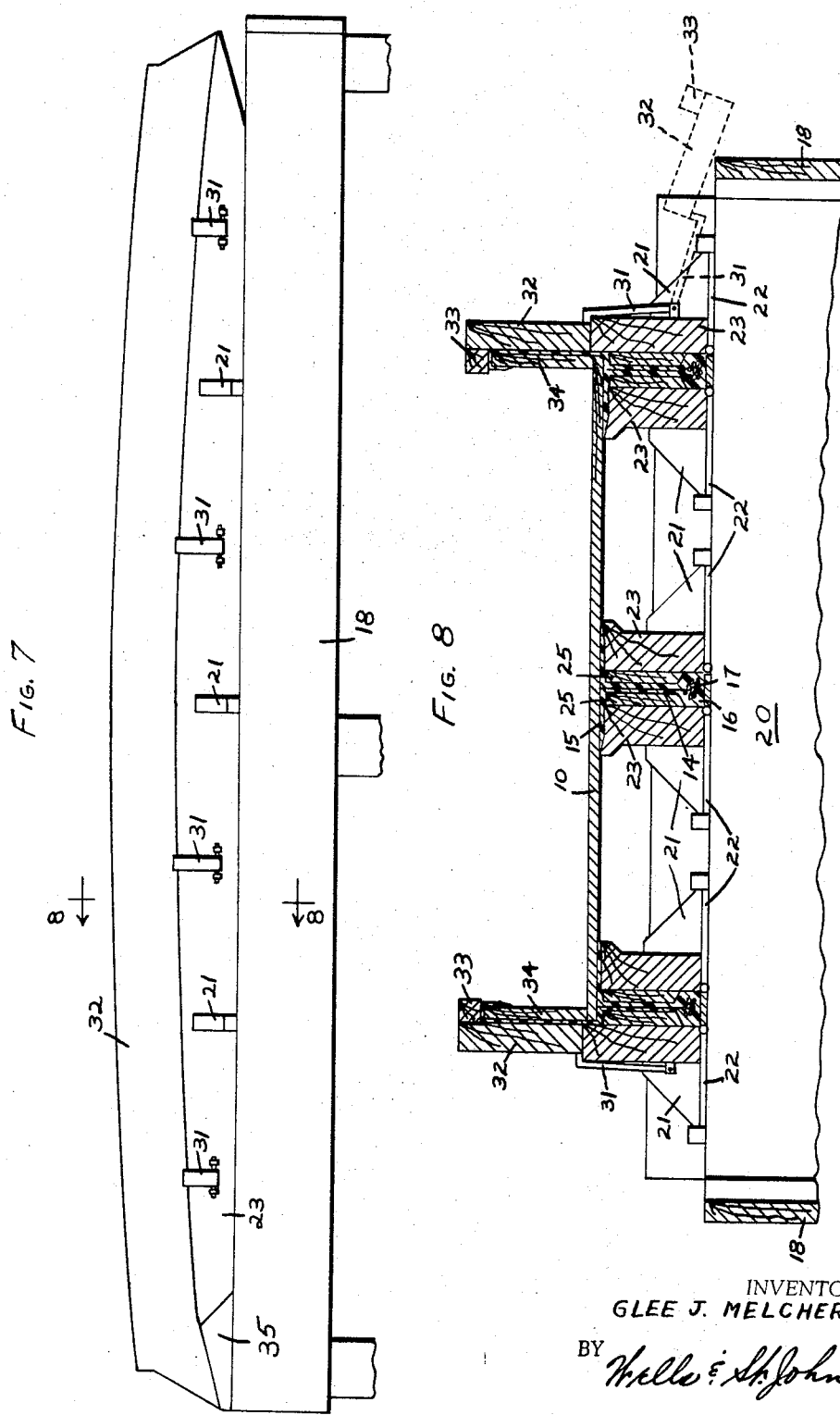

July 4, 1967   G. J. MELCHER   3,328,818
REINFORCED WALK RAMP
Filed March 31, 1965   4 Sheets-Sheet 4
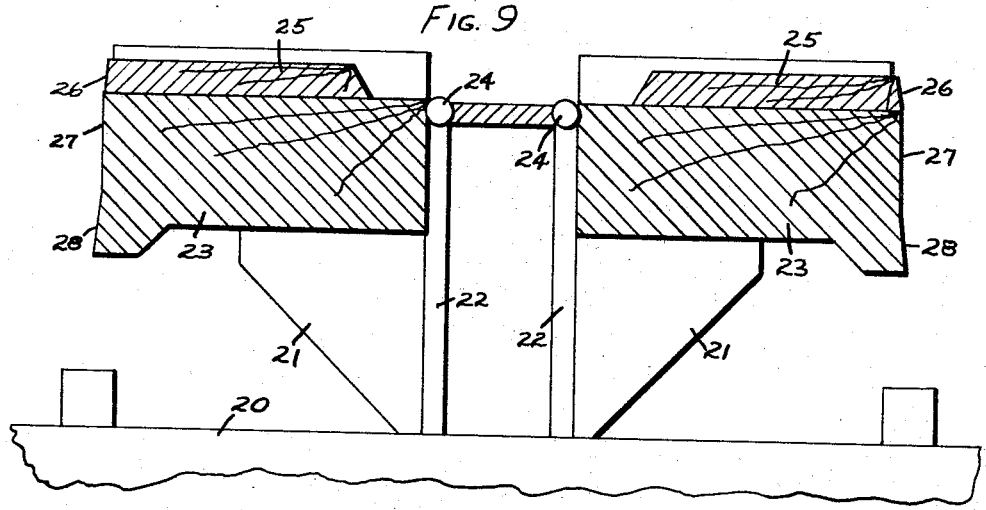
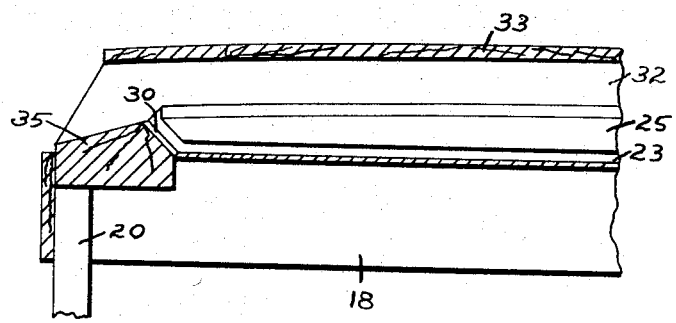
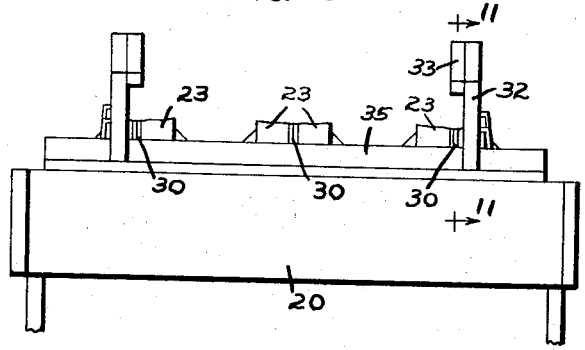
INVENTOR.
GLEE J. MELCHER
BY
ATTYS.

United States Patent Office 3,328,818
Patented July 4, 1967

3,328,818
REINFORCED WALK RAMP
Glee J. Melcher, E. 5708 1st Ave., Spokane, Wash. 72206; Ruth I. Melcher, executrix of said Glee J. Melcher, deceased
Filed Mar. 31, 1965, Ser. No. 444,263
2 Claims. (Cl. 14—72)

This invention relates to a novel reinforced walk ramp of the type utilized in loading and unloading trucks. It also relates to a novel method of fabricating the ramp as an integral reinforced structure.

The present ramp is an economical replacement for existing ramps made of metal or other more expensive materials. It is constructed from a sheet of relatively thin plywood reinforced along its bottom surface by longitudinal beams specifically constructed to resist both compressive and tensile forces.

It is a first object of this invention to provide a walk ramp having a unitary construction by which fibrous glass reinforced resin beams are integrally bonded to a sheet of suitable surfacing material along the total length thereof.

Another object of this invention is to provide a light weight ramp having high strength and load carrying capacity, the walk ramp being constructed of relatively inexpensive materials.

Another object of this invention is to provide an improved method of constructing reinforcing beams designed to accommodate both tensile and compressive forces along the length of a longitudinal member supported thereby. The advantageous strength properties of both continuous fibrous glass strands and continuous fibrous glass mats are combined to accommodate the peculiar forces to which the beam is subjected.

Another object of this invention is to provide a novel process by which the entire ramp is constructed as a unit, the forming of the beams being simultaneous with their application to the platform so as to best assure the continued integral nature of the final product.

These and further objects will be evident from the following disclosure, taken together with the accompanying drawings, which illustrates a preferred form of the invention. It is to be understood that this form of the invention is merely exemplary and that minor modifications can be made without deviating from the scope of the basic concept included therein.

In the drawings:

FIGURE 1 is a top view of a walk ramp constructed according to the present invention;

FIGURE 2 is a bottom view of the ramp shown in FIGURE 1;

FIGURE 3 is a side elevation view of the ramp shown in FIGURE 1;

FIGURE 4 is an enlarged cross-sectional view of the ramp seen along line 4—4 in FIGURE 3;

FIGURE 5 is an enlarged fragmentary sectional view of the ramp as seen along line 5—5 in FIGURE 2;

FIGURE 6 is a view similar to FIGURE 5, showing the ramp as seen along line 6—6 in FIGURE 2;

FIGURE 7 is an elevational view of the mold apparatus utilized according to the process of this invention, the mold being illustrated during the curing of a platform;

FIGURE 8 is an enlarged cross-sectional view taken along line 8—8 in FIGURE 7;

FIGURE 9 is an enlarged fragmentary cross-sectional view taken through a single beam mold, the mold being shown in its opened condition;

FIGURE 10 is an end view of the empty mold as seen from the left in FIGURE 7; and FIGURE 11 is a fragmentary sectional view of one end of the mold as seen along line 11—11 in FIGURE 10.

Referring first to FIGURES 1 through 5, the walk ramp constructed according to this invention basically comprises a longitudinally curved sheet 10 of plywood or other suitable sheet material. The sheet 10 is bounded at each side by upwardly extending sides 11 and is reinforced along its lower surface by a plurality of longitudinal beams generally designated by the numeral 12. At one end, shown to the left in FIGURES 1 through 3, and in FIGURE 5, the sheet 10 terminates at a downwardly directed lip 13 adapted to overhang beyond the rear edge of a truck tail gate or truck bed so as to support the ramp. The opposite end of the ramp is sloped for ground contact. The ramp is constructed to support loads and personnel during loading and unloading of a truck, such as a moving van.

The construction of this walk ramp utilizes a combination of fibrous glass reinforced elements and a basic sheet surfacing material such as plywood. These materials are relatively inexpensive and also light in weight, making the walk ramp very competitive in comparison with metal structures.

The sheet 10 preferably has a resin coating on its upper surface, together with an imbedded friction material, such as ground walnut shells or other granular materials. This provides the required traction and wear resistance along the upper surface of the ramp. The lip 13 can be made from a board secured to the sheet 10 by resin with glass fiber reinforcing, but is more preferably constructed solely of glass fiber reinforced resin, the layers of glass and resin overlapping the end of sheet 10 (FIGURE 5). The sides 11 preferably have a core of plywod or other suitable material covered substantially by a glass fiber reinforcing mat and resin. The beams 12 have a structure including reinforcing materials oriented so as to accommodate compressive forces as well as tensile forces so as to make the walk ramp sufficiently strong to carry loads far in excess of those that could be managed by a much thicker sheet of surfacing material without reinforcement.

As can be seen in FIGURES 4, 5 and 6, the beams 12 basically include upright webs 14, upper flanges 15 and a lower enlarged section 16. The web 14 is made of two layers of fibrous glass mat impregnated with resin, the respective layers being folded outwardly at their top edges to form the flanges 15 which protrude outwardly at each side thereof. The mat layers, at their lower ends, fold about a central core made of longitudinally aligned fibrous glass strands 17. These continuous strands are imbedded in the resin matrix and therefore cured integrally with the mat that forms the web 14 and flange 15. The enlarged section 16 extends angularly toward sheet 10 at each end of the platform (FIGURES 5 and 6) and the strands 17 continue beyond the ends of the beams, the strands 17 having their outer ends secured to the surfaces of the sheet 10 by a layer of resin so as to tie the ends of the strands 17 relative to sheet 10.

The flanges 15 are secured by the resin from which they are fabricated to the bottom surface of the longitudinally curved sheet 10. At each side of the platform, the outer flange continues upwardly along the outer surface of the side 11 over the top edge thereof and at least partially down the inside surface of the side 11 to secure and reinforce this structure relative to the sheet 10.

The beams 12 are therefore integrally secured to the lower surface of sheet 10 and to the sides 11 by the resin impregnated mat structure. As will be described below, the beams 12 are preferably molded in place on the sheet 10 so as to insure intimate adhesive characteristics of the resin along the entire length of each beam 12. This, together with the anchoring of the fibers 17 at each end of sheet 10, insures against the possibility of the beam 12 separating from sheet 10.

The random nature of the resin impregnated glass fiber mat used in the beam 12 provides the necessary structural strength in the web 14 and flanges 15 required to accommodate the compressive forces exerted thereon during the application of a load to the top surface of sheet 10. The longitudinal strands 17 imbedded within this mat and extending along the lower portion of the beam are provided to accommodate the tensile force to which this portion of the beam is subjected during use of the platform. The fastening of the ends of strands 17 to the sheet 10 transfers these tensile forces to the material of the sheet 10 to add to the reinforcing value of these tensile members.

The structure just described provides a lightweight walk ramp having the necessary design to be supported between a truck and the ground. It utilizes a resin and glass fiber reinforced structure formed in a unitary manner to direct forces thereon to the structural members best adapted to accommodate such forces. The combination of the tensile and compressive members in the reinforcing beams 12 provides considerable strength to the sheet 10, making possible the use of a very light and flexible sheet 10 in actual practice.

The method of fabricating the walk ramp can best be understood from FIGURES 7 to 11. The platform is constructed in a unitary manner, all of the various portions being cured at one time. A mold is shown in FIGURES 7 through 11 on an open table 18 having longitudinally spaced cross members 20. The cross members 20 support transversely spaced molds for the various beams. The number of molds utilized to produce a given platform will vary, depending upon the width of the desired platform. As shown, there is one central mold and the two side molds. In wider beams, additional central molds would be utilized.

Each mold for a beam 12 is hinged so as to open in the manner shown in FIGURE 9. The resin impregnated glass fiber strands are placed on the open mold, which is then closed to produce the desired cross-sectional cavity, the material within the mold being then ready for application to a sheet placed upon the top mold surfaces.

Taking first the center mold, the specific details of the mold can be seen in FIGURES 8 and 9. It basically comprises two side blocks 21 having a triangular configuration and connected to a metal base 22. Each metal base 22 also spans the lower edge of a longitudinal wooden plate 23, the plates 23 extending continuously along the length necessary for a given platform.

The two plates 23 are held transversely apart by a hinge structure having pivotal connections at 24 transversely spaced from one another a distance equal to the desired thickness of the lower portion 16 of each beam 12. The hinges extend along the full length of the mold so as to insure against deviation in thickness at any given area.

Fixed to the inner surfaces of the plates 23 are strips 25 which, together with the plates 23, define the mold cavity when the mold has been closed as shown in FIGURE 8. When the mold is closed, the strips 25 are separated by a distance equal to the desired thickness of the web 14.

The top edges of the strips 25, when closed, are tapered at a slight upward angle relative to the horizontal and are designated in FIGURE 9 by the numeral 26. Surfaces 26 are extended horizontally on the plates 23 at 27, this surface again terminating in a slight upward angle at 28. The surfaces 26 through 28 define the desired configuration of the flanges 15 produced along the top of each beam 12.

The strips 25 do not continue along the full length of the plates 23, as can be seen in FIGURE 11. At the outer ends, the strips 25 are terminated and cooperate with lower strips 30 fixed to the respective plates 23 to form the previously described terminal portions of the enlarged section 16 at each end of beam 12. These terminal portions extend upwardly to a point wherein they intersect the lower surface of the sheet 10.

The side molds for producing the side beams 12 are basically identical to that previously described, except that the outer plates 23 are taller, being adapted to abut the side edges of sheet 10 when placed in position as shown in FIGURE 8. The flange formed in the side beams terminates at the outer edge of the strip 25. Pivotally mounted at the outer surface of each plate 23 by means of hinged brackets 31 are side forming plates 32 having a top strip 33. The offset position of the pivotal axes of brackets 31 permits the plates 32 to swing over the curved upper surfaces of plates 23 so as to come into position as shown in FIGURE 8 as an upper extension of the lower plate 23. This is shown in dashed lines at the right hand end of FIGURE 8.

In preparing the formation of a walk ramp, the first step is to cut lengths of glass fiber mat having a sufficient width to cover the inner surfaces of the mold cavity and to overlap along surfaces 26 through 28 where the extended flange is produced at the top of a beam or to cover the sides 11 in the manner shown in FIGURE 8. The mat is placed on a sheet of film such as "cellophane" and are suitably impregnated with a resin, such as a thermosetting polyester or epoxy resin. Next, longitudinal glass fiber strands are pulled through a supply of resin so as to thoroughly coat the strands with the same resin. The strands are placed longitudinally along the prepared mat at the center thereof. The film is then placed on the open mold in the condition shown in FIGURE 9. The longitudinal strands are located directly above the central hinged portion of the mold.

Each mold is then closed by pivoting the two plates 23 relative to one another, the metal plates 22 resting on the cross members 20 when the molds are properly closed. An excess of resin is applied to both the mat and the longitudinal fibers prior to closing of the mold to ensure complete filling of the mold cavity formed between plates 23 and strips 25. The upper edges of the mats are folded outwardly to each side along surfaces 26 through 28 to form the required flanges at the top of each beam. The longitudinal fibrous glass strands are continued along the terminal portion of each mold between the strips 25 and 30 to form the upwardly directed terminal section of each enlarged lower beam section 17.

The sheet of material 10 is then placed on the longitudinally curved top surfaces of the molds as seen in FIGURE 8. The side edges of the sheet 10 will abut the resin impregnated mat at each side of the assembly. Preformed sheets used as the core of the sides 11 are then placed in an upright position at the sides of sheet 10, these cores being designated in FIGURE 8 by the numeral 34. The plates 32 are then swung upwardly to press the resin impregnated fibrous mat against the outside edges of the sheet 34 and to bring the top of the mat over the top edge of sheet 34, the mat preferably extending at least partially along the inside surface of the sheet 34. The entire assembly is then clamped and allowed to cure, using suitable catalysts, promoters and heat. During the curing of the resin, the sheet 10 should be clamped relative to the mold to ensure the required pressure necessary to produce the bond between the resin and wood or other material used in sheet 10.

At the end of the walk ramp shown in FIGURE 6, the terminal portion of the enlarged section 16 at the lower end of each beam 12 extends to the outer end of the sheet 10. This forms a sloped surface at the bottom of the walk ramp adapted to be supported on the ground. At the remaining or upper end of the walk ramp, an extended lip 13 is formed of glass fiber reinforced resin. This can be laid up on a suitable forming block 35 at one end of the mold assembly, the required layers of mat being impregnated with resin and at least a portion of the layers overlapping the end of the sheet 10 in the manner shown in FIGURE 5. At this end, the terminal ends of sections 16 extend to the end of sheet 10 and stop short of the lip 13, which is designed to fit over the rear edge of a truck bed or tail gate.

The outer ends of the glass fiber strands 17 are flattened beyond the terminal ends of section 16 and laid against the surfaces of lip 13 or sheet 10 as can be seen in FIGURES 5 and 6. These strands, impregnated within a layer of resin, are allowed to cure and thereby bond to the sheet 10 and lip 13 for additional reinforcement. They provide an anchor for the strands 16 to absorb tensile forces in the beams 12.

After the entire assembly has cured in the manner shown in FIGURE 8, it is removed from the mold and the film is removed. The upper surfaces of the sheet 10 and the inside surfaces of the side sheets 34 are then coated with resin, and covered or surfaced as might be desired.

This method insures the integral production of a walk ramp with suitable reinforcing to provide a unitary structure that will not part under load. Modifications can be made in the construction, and the novel beam construction described herein can be used in applications other than walk ramps.

The beam reinforcing used in the production of this walk ramp provides a novel combination of a fibrous glass reinforced member capable of withstanding compressive forces along the wide flange and central upstanding web and capable of withstanding tensile forces along its lower enlarged section. It has widespread application in structural applications where such force requirements must be met. It can be formed integrally with the member which it is to enforce, as described herein, or can be formed separately as a structural unit for fabrication purposes.

Many different resins and many different sheet materials could be utilized to produce the article described herein. The process disclosed is not limited to the production of any particular item, but is applicable to any item formed in the manner described with reinforcing members of glass fibers impregnated with resin. For these reasons, while the above description describes a concrete example of a product and method utilizing the concepts of my invention, my invention is not to be restricted except as it is defined in the following claims.

Having thus described my invention, I claim:
1. In a reinforced ramp structure:
  a sheet of material comprising a load-supporting platform having an upper surface and an opposed underside;
  a plurality of longitudinal reinforcing beams secured to the underside of said sheet and extending continuously along the length thereof in parallel transversely spaced longitudinal positions;
  each of said beams comprising:
    an upright longitudinal web formed of fibrous glass impregnated with resin;
    a longitudinal flange extending outward from the upper edge of the web and secured to the underside of said sheet along the length thereof, said flange include a continuation of said fibrous glass impregnated with resin and formed integrally with said web;
    the lower section of said web including imbedded longitudinal glass fiber strands extending continuously along its length and impregnated with resin integrally with the remainder of said web and said flange; and
    the lower section of each of said beams being directed angularly upward at the ends thereof, the outer ends of the fiber strands being continued beyond the beam ends and secured to the sheet within a resin layer affixed thereto.
2. In a reinforced ramp structure:
  a sheet of material comprising a load-supporting platform having an upper surface and an opposed underside;
  a plurality of longitudinal reinforcing beams secured to the underside of said sheet and extending continuously along the length thereof in parallel transversely spaced longitudinal positions;
  each of said beams comprising:
    an upright longitudinal web formed of fibrous glass impregnated with resin;
    a longitudinal flange extending outward from the upper edge of the web and secured to the underside of said sheet including a continuation of said fibrous glass impregnated with resin and formed integrally with said web;
    the lower section of said web including imbedded longitudinal glass fiber strands extending continuously along its length and impregnated with resin integrally with the remainder of said web and said flange;
    a pair of upright side walls extending upwardly from said sheet along the respective side edges of its upper surface;
    the fibrous glass and resin of the respective webs in the outer beams being continued upwardly over the outside and top surfaces of the side walls to complete a unitary reinforced structure.

References Cited

UNITED STATES PATENTS

| | | | |
|---|---|---|---|
| 2,284,022 | 5/1942 | Schmeller | 14—72 |
| 2,425,883 | 8/1947 | Jackson. | |
| 2,855,021 | 10/1958 | Hoppe. | |
| 2,938,566 | 5/1960 | Toulmin. | |
| 3,111,569 | 11/1963 | Rubenstein | 52—309 |

JACOB L. NACKENOFF, *Primary Examiner.*